(12) United States Patent
Kim et al.

(10) Patent No.: US 10,614,186 B2
(45) Date of Patent: Apr. 7, 2020

(54) APPARATUS FOR PREDICTING YIELD OF SEMICONDUCTOR INTEGRATED CIRCUIT AND METHOD FOR MANUFACTURING SEMICONDUCTOR DEVICE USING THE SAME

(71) Applicant: Samsung Electronics Co., Ltd., Suwon-si, Gyeonggi-do (KR)

(72) Inventors: Seong Ryeol Kim, Seoul (KR); Jeong Hoon Ko, Hwaseong-si (KR); Seong Je Kim, Seongnam-si (KR); Je Hyun Lee, Suwon-si (KR); Jong Wook Jeon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 54 days.

(21) Appl. No.: 15/901,358

(22) Filed: Feb. 21, 2018

(65) Prior Publication Data

US 2019/0065630 A1    Feb. 28, 2019

(30) Foreign Application Priority Data

Aug. 30, 2017  (KR) .......................... 10-2017-0109787

(51) Int. Cl.
*G06F 17/50*  (2006.01)
*G06N 3/08*  (2006.01)
*G06F 17/18*  (2006.01)
*G06N 3/04*  (2006.01)
*H01L 27/02*  (2006.01)
(Continued)

(52) U.S. Cl.
CPC ............ *G06F 17/504* (2013.01); *G06F 17/18* (2013.01); *G06N 3/04* (2013.01); *G06N 3/08* (2013.01); *H01L 27/0207* (2013.01); *H01L 27/0924* (2013.01); *H01L 29/66795* (2013.01); *G06F 17/5009* (2013.01); *G06F 17/5068* (2013.01); *G06F 2217/12* (2013.01); *G06F 2217/16* (2013.01); *H01L 27/1104* (2013.01); *H01L 29/1037* (2013.01); *H01L 29/7851* (2013.01)

(58) Field of Classification Search
CPC ...................................................... G06F 17/504
USPC ........................................................ 716/107
See application file for complete search history.

(56) References Cited

U.S. PATENT DOCUMENTS 8,374,839 B2   2/2013  Satoh
9,483,602 B2  11/2016  McConaghy et al.
(Continued)

FOREIGN PATENT DOCUMENTS

JP    2008021805 A    1/2008

*Primary Examiner* — Suresh Memula
(74) *Attorney, Agent, or Firm* — Harness, Dickey & Pierce, P.L.C.

(57) ABSTRACT

A yield prediction apparatus is provided. The yield prediction apparatus may include at least one processor coupled to at least one non-transitory computer-readable medium. The at least one processor may be configured to receive a first variable associated with operating characteristics of a semiconductor device, perform a simulation for the operating characteristics of the semiconductor device, perform a neural network regression analysis using a result of the simulation to determine a first function for the first variable, and predict a yield of the semiconductor integrated circuit based on an advanced Monte Carlo simulation. An input of the advanced Monte Carlo simulation may include the determined first function.

20 Claims, 18 Drawing Sheets

(51) Int. Cl.
  *H01L 27/092*   (2006.01)
  *H01L 29/66*    (2006.01)
  *H01L 29/78*        (2006.01)
  *H01L 27/11*        (2006.01)
  *H01L 29/10*        (2006.01)

(56) References Cited

U.S. PATENT DOCUMENTS

| | | | |
|---|---|---|---|
| 2002/0072872 A1* | 6/2002 | Chatterjee | G06F 17/5036 |
| | | | 702/117 |
| 2015/0371134 A1 | 12/2015 | Chien et al. | |
| 2016/0224705 A1* | 8/2016 | Joshi | G06F 17/5009 |
| 2016/0275223 A1* | 9/2016 | McConaghy | G06F 17/5036 |
| 2016/0321523 A1 | 11/2016 | Sen et al. | |
| 2017/0109646 A1 | 4/2017 | David | |

* cited by examiner

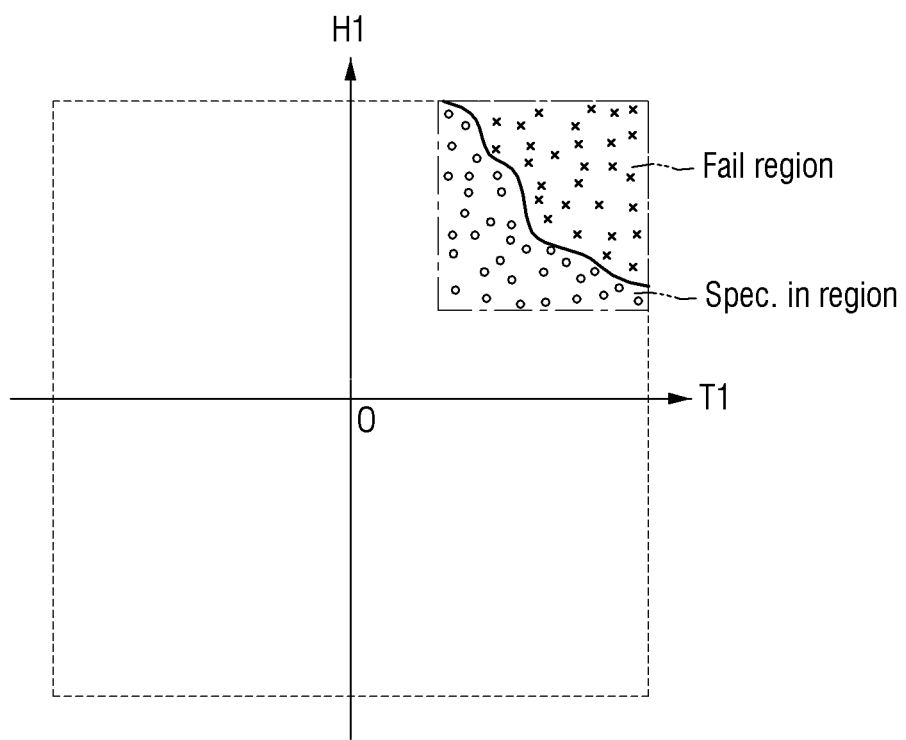

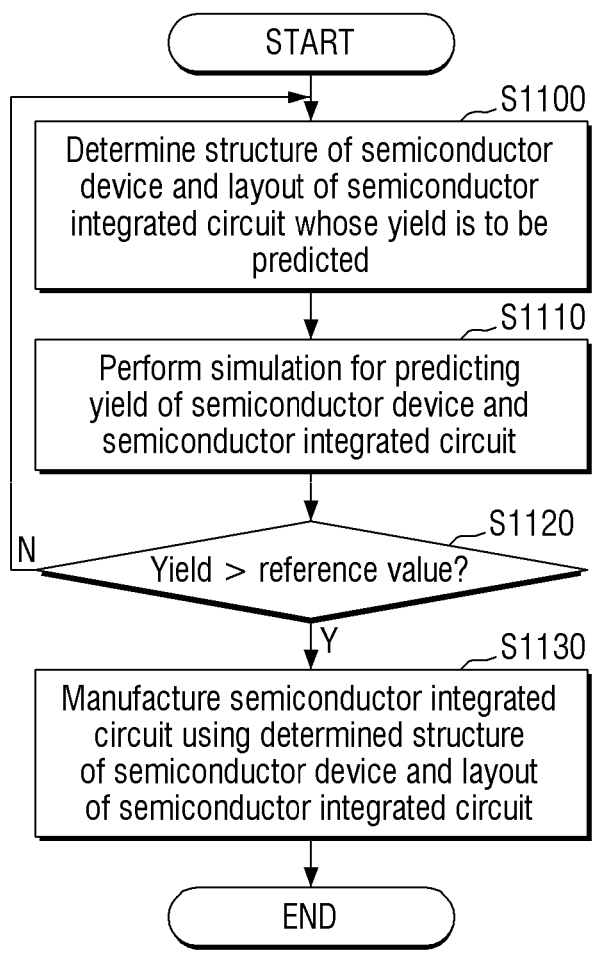

APPARATUS FOR PREDICTING YIELD OF SEMICONDUCTOR INTEGRATED CIRCUIT AND METHOD FOR MANUFACTURING SEMICONDUCTOR DEVICE USING THE SAME

CROSS-REFERENCE TO RELATED APPLICATION

This application claims priority from Korean Patent Application No. 10-2017-0109787 filed on Aug. 30, 2017 in the Korean Intellectual Property Office, and all the benefits accruing therefrom under 35 U.S.C. 119, the entire contents of which are herein incorporated by reference.

BACKGROUND

1. Technical Field

The present disclosure relates to a yield prediction apparatus for predicting a yield of a semiconductor integrated circuit and a method for manufacturing a semiconductor device using the same, and more particularly, to an apparatus for predicting a yield of a semiconductor integrated circuit based on results of neural network regression analysis.

2. Description of Related Art

When there is a system (e.g., a transfer function) having a certain degree of complexity, a mathematical model or a natural phenomenon, interpreting the relationship of the output to the input may be used to understand the system. By analyzing the probability of output (Pass, Fail) when a measured variation input is applied for realistic system analysis, reliability can be interpreted by a simulation technique without actual implementation of the system.

However, in the field of integrated circuit (IC) yield analysis, when there are a large number of process variables, it becomes increasingly difficult to evaluate very rare defect events (e.g., defect events that rarely occur).

Since an array includes billions of life cycles and only a few cell defects may cause a severe problem, a defect rate in "high-sigma (e.g., 6σ or more)" tail of the distribution is important. For example, in a 1 Mb memory block, each individual memory cell of the memory block may require a defect rate of 1E-07 or less to achieve a yield of 90%.

SUMMARY

Inventive concepts relate to an apparatus for predicting a yield of a semiconductor integrated circuit based on a parametric loss yield (PLY) of a semiconductor integrated circuit through a simulation using a result of neural network regression analysis.

Inventive concepts also relate to an apparatus for predicting a yield of a semiconductor integrated circuit based on a defect loss yield (DLY) of a semiconductor integrated circuit through a simulation using a result of neural network regression analysis.

Inventive concepts also relate to a method for manufacturing a semiconductor device using a yield prediction apparatus based on a parametric loss yield and a defect loss yield of a semiconductor integrated circuit.

According to some example embodiments, a yield prediction apparatus may include at least one processor coupled to at least one non-transitory computer-readable medium. The at least one processor may be configured to receive a first variable associated with operating characteristics of a semiconductor device and perform a simulation for the operating characteristics of the semiconductor device. The at least one processor may be configured to perform a neural network regression analysis using a result of the simulation to determine a determined first function for the first variable. The at least one processor may be configured to predict a yield of a semiconductor integrated circuit based on an advanced Monte Carlo simulation. An input of the advanced Monte Carlo simulation may include the determined first function.

According to some example embodiments, a yield prediction apparatus may include at least one processor coupled to at least one non-transitory computer-readable medium. The at least one processor may be configured to receive a first variable associated with layout characteristics of a semiconductor integrated circuit and perform an emulation for the layout characteristics of the semiconductor integrated circuit. The at least one processor may be configured to perform a neural network regression analysis using a result of the emulation to determine a determined first function for the first variable. The at least one processor may be configured to predict a yield of the semiconductor integrated circuit based on an advanced Monte Carlo simulation. An input of the advanced Monte Carlo simulation may include the determined first function.

According to some example embodiments, a method for manufacturing a semiconductor device may include determining a determined structure of a semiconductor device and a determined layout of a semiconductor integrated circuit, performing a simulation using a yield prediction apparatus to predict a yield of the semiconductor integrated circuit including the determined structure of the semiconductor device and the determined layout of the semiconductor device, and manufacturing the semiconductor integrated circuit using the determined structure of the semiconductor device and the determined layout of the semiconductor integrated circuit in response to the predicted yield being equal to or greater than a desired value. The yield prediction apparatus may include at least one processor coupled to at least one non-transitory computer-readable medium. The at least one processor may be configured to receive a first variable associated with operating characteristics of the semiconductor device and perform a simulation for the operating characteristics of the semiconductor device. The at least one processor may be configured to receive a second variable associated with layout characteristics of the semiconductor integrated circuit and perform an emulation for the layout characteristics of the semiconductor integrated circuit. The at least one processor may be configured to perform a neural network regression analysis using a result of the simulation and a result of the emulation to determine a determined first function for the first variable and a determined second function for the second variable. The at least one processor may be configured to predict a predicted yield of the semiconductor integrated circuit based on an advanced Monte Carlo simulation. An input of the advanced Monte Carlo simulation may include the determined first function and the determined second function.

However, inventive concepts are not restricted to those set forth herein. The above and other aspects of inventive concepts will become more apparent to one of ordinary skill in the art to which the present disclosure pertains by referencing the detailed description of some example embodiments provided below.

BRIEF DESCRIPTION OF THE DRAWINGS

The above and other aspects and features of inventive concepts will become more apparent by describing some example embodiments thereof with reference to the attached drawings, in which:

FIG. 8B is an example diagram illustrating shifting the center value of the fail inducing factor according to some embodiments.

FIG. 11 is an example flowchart illustrating a method of manufacturing a semiconductor device using a semiconductor yield prediction method, according to some embodiments.

DETAILED DESCRIPTION

Figure 1A:
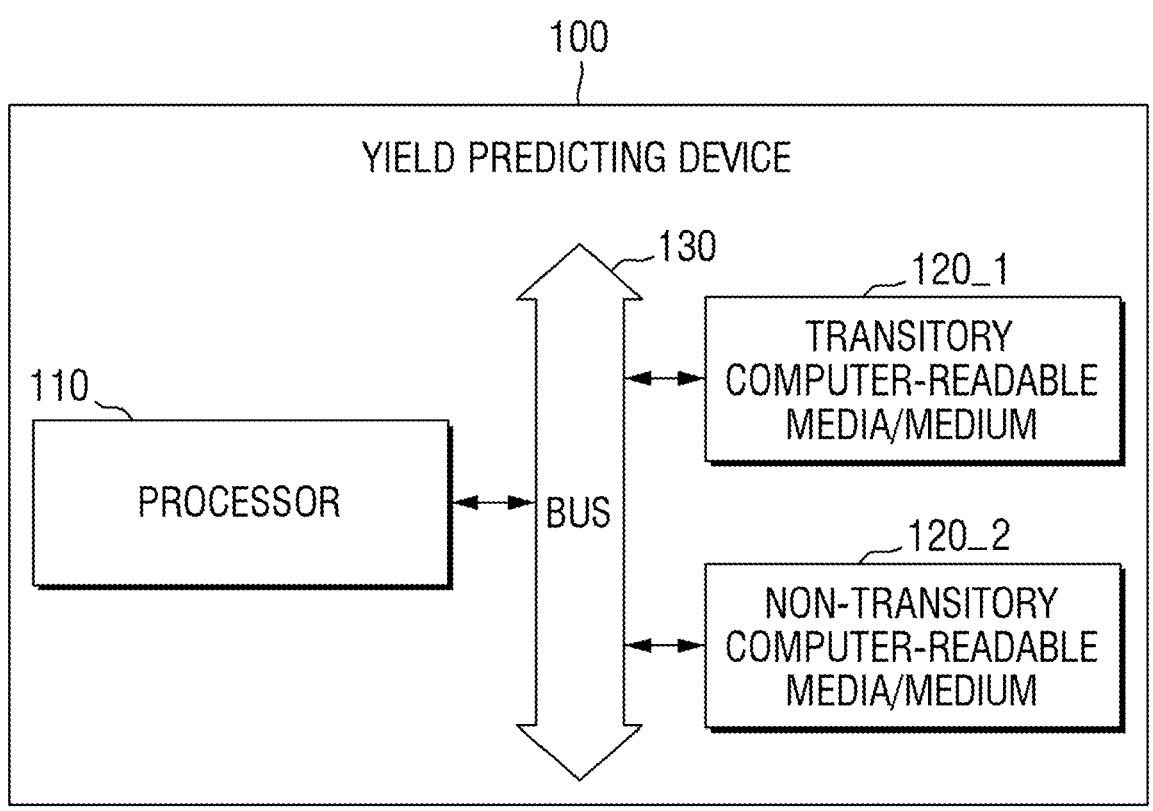
FIG. 1A is an example block diagram illustrating an apparatus that implements a method for predicting a yield of a semiconductor integrated circuit using a neural network according to some embodiments.

FIG. 1A is an example block diagram illustrating an apparatus that implements a method for predicting a yield of a semiconductor integrated circuit using a neural network according to some embodiments.

Referring to FIG. 1A, a yield prediction method according to some embodiments may be implemented in a yield prediction apparatus including at least one processor 110, at least one transitory computer readable medium 120_1, at least one non-transitory computer readable medium 120_2, and a bus 130.

The at least one processor 110 may be a processor which executes computer program instructions and interacts with other system components to perform various functions described herein. The processor 110 may include a hardware processor, such as a central processing unit (CPU) and/or a graphic processing unit (GPU), that when executing instructions according to instructions in the at least one transitory computer readable medium 120_1 and/or at least one non-transitory computer readable medium 120_2, configures the at least one processor 110 as a special purpose processor for controlling one or more operations discussed below.

The processor 110 according to some embodiments may perform a simulation (e.g., TCAD simulation) of the operating characteristics of a semiconductor device to be described later. Also, the processor 110 according to some embodiments may perform an emulation (e.g., 3D emulation) of the layout characteristics of a semiconductor integrated circuit to be described later. Further, the processor 110 according to some embodiments may perform neural network regression analysis to be described later.

The transitory computer readable medium 120_1 may be a medium, such as a register, a cache, a static random access memory (SRAM) and a dynamic random access memory (DRAM), which temporarily stores data and is readable by the device. Unlike the one shown in FIG. 1A, the transitory computer readable medium 120_1 may be included in the processor 110. For example, the results of the computations performed by the processor 110 may be stored in the transitory computer readable medium 120_1 included in the processor 110. However, inventive concepts are not limited thereto.

The non-transitory computer readable medium 120_2 may be a medium, such as CD, DVD, hard disk, blu-ray disk, USB and ROM, which semi-permanently stores data and is readable by the device.

The computer program instructions may be stored in the transitory computer readable medium 120_1 and/or the non-transitory computer readable medium 120_2. Further, in some embodiments, the simulation or emulation result values may be stored in the transitory computer readable medium 120_1 or the non-transitory computer readable medium 120_2. Also, in some embodiments, the intermediate values that occur during the learning process of the neural network may be stored in the transitory computer readable medium 120_1 or the non-transitory computer readable medium 120_2. Also, in some embodiments, a final predicted yield, for example, a parametric loss yield (PLY) or a defect loss yield (DLY) may be stored in the transitory computer readable medium 120_1 or the non-transitory computer readable medium 120_2. However, inventive concepts are not limited thereto.

The bus 130 may be a connection path between the processor 110, the transitory computer readable medium 120_1, and the non-transitory computer readable medium 120_2. For example, the results of the computations performed by the processor 110 may be transferred to the transitory computer readable medium 120_1 or the non-transitory computer readable medium 120_2 via the bus 130. For example, data stored in the transitory computer readable medium 120_1 may be transferred to the non-transitory computer readable medium 120_2 via the bus 130.

Figure 1B:
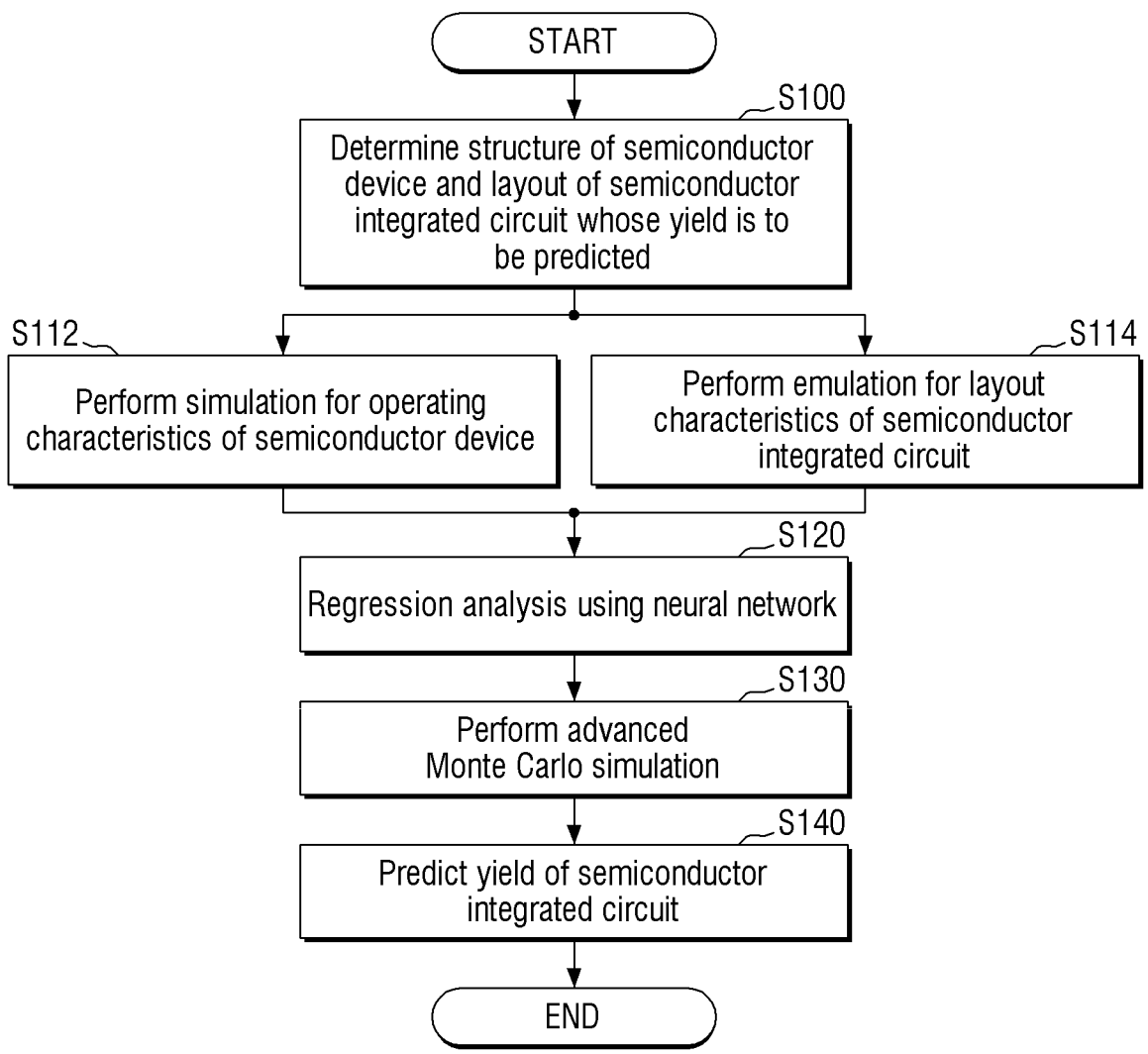
FIG. 1B is an example flowchart illustrating a method for predicting a yield of a semiconductor integrated circuit using a neural network according to some embodiments.

FIG. 1B is an example flowchart illustrating a method for predicting a yield of a semiconductor integrated circuit using a neural network according to some embodiments.

Referring to FIG. 1B, first, a structure of a semiconductor device and a layout of a semiconductor integrated circuit whose yield is to be predicted are determined (S100).

The structure of the semiconductor device and the layout of the semiconductor integrated circuit will be described in detail with reference to FIGS. 2A to 2C.

Figure 2A:
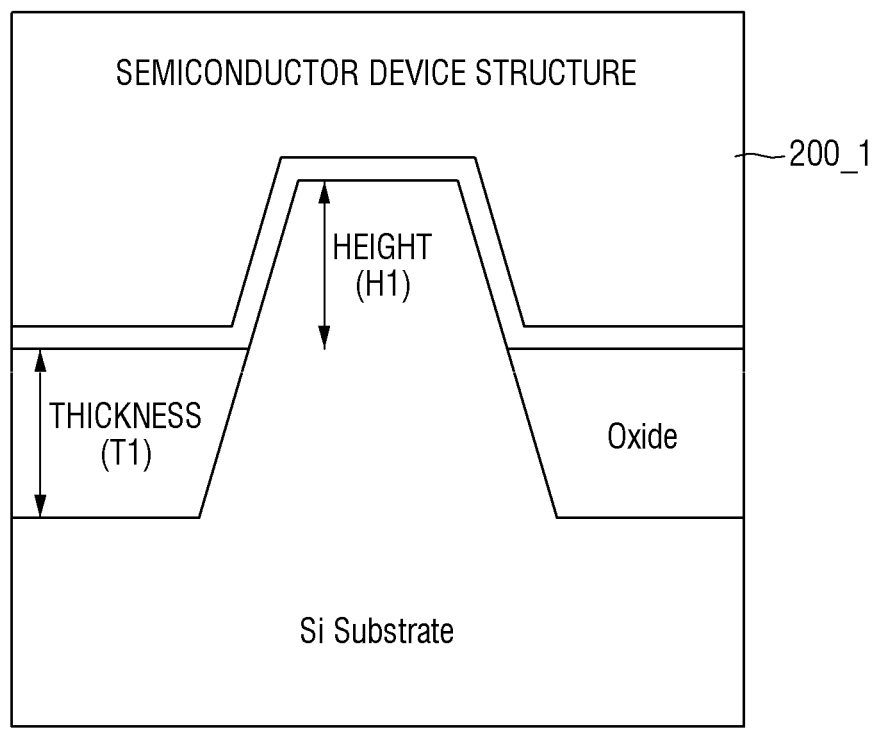
FIG. 2A is an example diagram illustrating a structure of a semiconductor device according to some embodiments.

FIG. 2A is an example diagram illustrating a structure of a semiconductor device according to some embodiments.

Figure 2B:
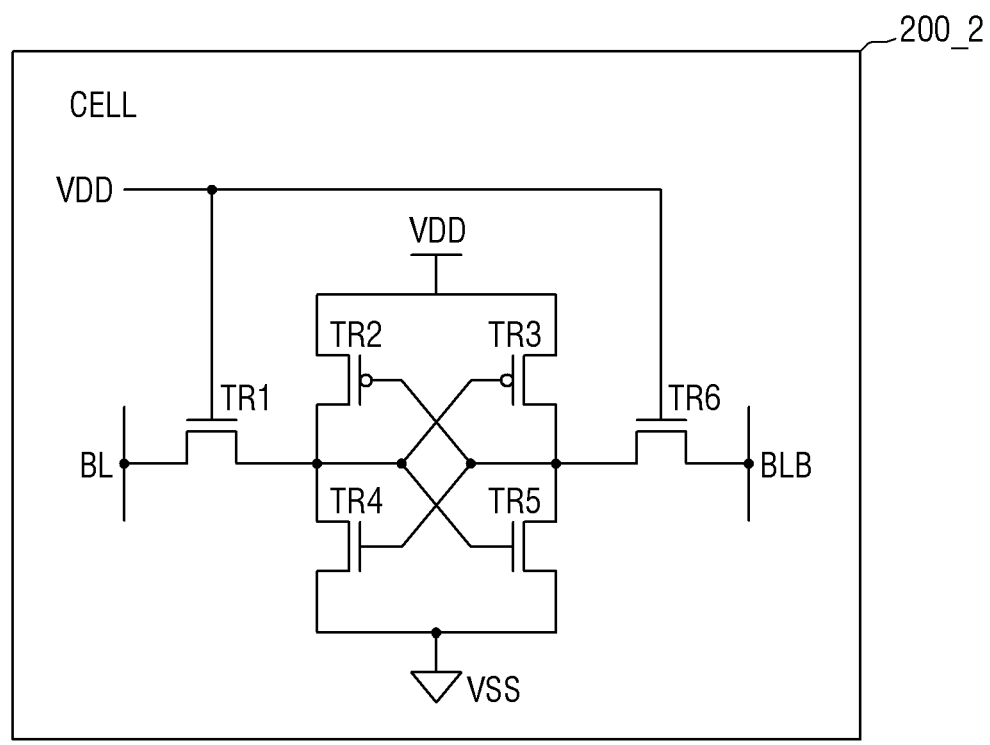
FIG. 2B is an example diagram illustrating a compact model and a netlist according to some embodiments.

FIG. 2B is an example diagram illustrating a compact model and a netlist according to some embodiments.

Figure 2C:
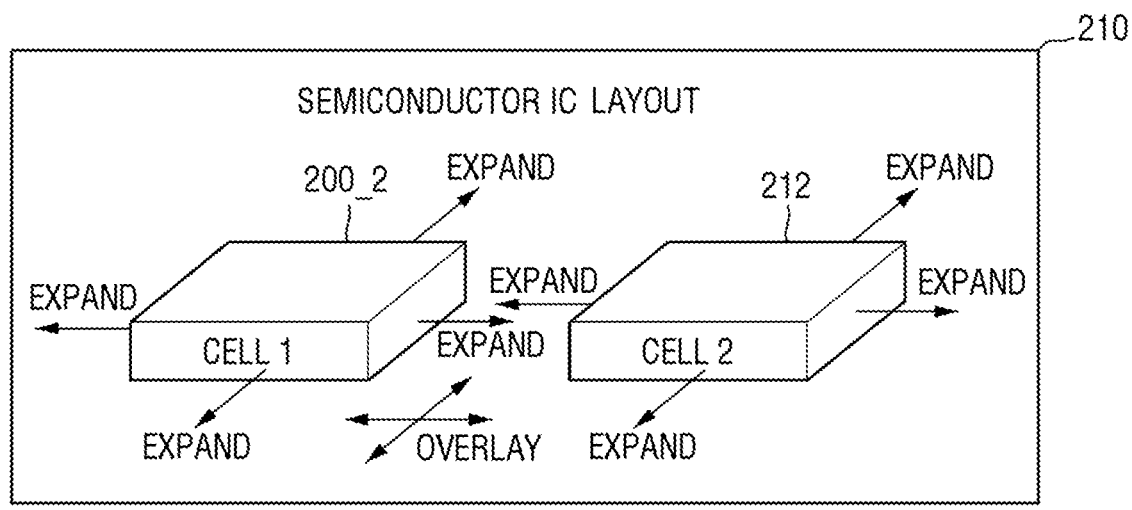
FIG. 2C is an example diagram illustrating a layout of a semiconductor integrated circuit according to some embodiments.

FIG. 2C is an example diagram illustrating a layout of a semiconductor integrated circuit according to some embodiments.

In FIG. 2A, for convenience of explanation, a semiconductor device structure 200_1 is schematically illustrated as a structure of a FinFET, but inventive concepts are not limited thereto. For example, the semiconductor device may be, but not limited to, a resistor, an inductor, a capacitor, a transistor, and/or a diode. The structure of the FinFET shown in FIG. 2A is also schematically illustrated for convenience of explanation, and the structure of the FinFET is not limited thereto.

The operating characteristics of the semiconductor device may vary depending on, for example, a thickness T1 of a gate insulating film and/or a height H1 of a fin. Therefore, a first variable associated with the operating characteristics of the semiconductor device may be the thickness T1 of the gate insulating film and the height H1 of the fin. For example, a threshold voltage value of the semiconductor device may vary depending on the thickness T1 of the gate insulating film. Further, the threshold voltage value of the semiconductor device may vary according to the height H1 of the fin.

However, in the present disclosure, it is merely for convenience of explanation that the thickness T1 of the gate insulating film and the height H1 of the fin are set as the first variable, and inventive concepts are not limited thereto. In some embodiments, the first variable associated with the operating characteristics of the semiconductor device may be various factors such as a thickness and shape of a spacer, and a concentration of impurities.

Referring to FIG. 2B, a compact model and a netlist 200_2 of FIG. 2B may be configured using the structure of the semiconductor device determined in FIG. 2A. FIG. 2B illustrates, for example, a case where the semiconductor integrated circuit is a static random access memory (SRAM).

The compact model may be a simplified model for a simulation for a semiconductor device. Further, the compact model may be a minimum unit for performing a simulation.

A netlist may be a list of semiconductor devices in a circuit and a list of nodes to which they are connected. In FIG. 2B, the compact model and the netlist may include, for example, one cell of the SRAM. In FIG. 2B, at least one of a plurality of transistors TR1 to TR6 may be a transistor according to some embodiments, for example, a transistor having the semiconductor device structure 200_1 of FIG. 2A.

The layout of a semiconductor integrated circuit according to some embodiments will be described with reference to FIGS. 2A to 2C.

The layout of the semiconductor integrated circuit according to some embodiments may include a plurality of compact models and netlists. Referring to FIG. 2C, for example, a layout of a semiconductor integrated circuit according to some embodiments may include an array of SRAM cells. In other words, the compact model and the netlist 200_2 of FIG. 2B may include the semiconductor device structure 200_1 of FIG. 2A, and the semiconductor integrated circuit layout 210 of FIG. 2C may include the compact model and the netlist 200_2 of FIG. 2B.

The layout characteristics of the semiconductor integrated circuit may vary depending on, for example, a horizontal position change (OVERLAY) of the cell and/or an expansion degree (EXPAND) of the cell. Therefore, a second variable associated with the layout characteristics of the semiconductor integrated circuit may be, for example, a horizontal position change (OVERLAY) of the cell and an expansion degree (EXPAND) of the cell. For example, a connection degree between the cell and the wiring and/or a cell 200_2 and a cell 212 may vary depending on the horizontal position change (OVERLAY) of the cell and the expansion degree (EXPAND) of the cell.

However, in the present disclosure, it is merely for convenience of explanation that the horizontal position change (OVERLAY) of the cell and the expansion degree (EXPAND) of the cell are set as the second variable, and inventive concepts are not limited thereto. In some embodiments, the second variable associated with the layout characteristics of the semiconductor integrated circuit may be various factors such as a thickness of the wiring, a position of the wiring, a thickness of the cell and the like.

In some embodiments, the semiconductor integrated circuit may include, but not limited to, an operational amplifier, a signal generator, a converter, a regulator, Resistor-Transistor Logic (RTL), Direct Coupled Transistor Logic (DCTL), Integrated Injection Logic (IIL), Diode-Transistor Logic (DTL), Transistor-Transistor Logic (TTL), Schottky Transistor-Transistor Logic (S-TTL), Emitter Coupled Logic (ECL), a Negative Metal Oxide Semiconductor (NMOS), a Positive Metal Oxide Semiconductor (PMOS), a Complementary Metal Oxide Semiconductor (CMOS), a Random Access Memory (RAM), a Read Only Memory (ROM), a flash memory, and/or a microprocessor.

Referring again to FIG. 1B, when a semiconductor device whose yield is to be predicted is determined, a simulation for the operating characteristics of the semiconductor device may be performed (S112).

The result of the simulation for the operating characteristics of the semiconductor device may be, for example, a current-voltage curve (I-V curve) or a capacitance-voltage curve (C-V curve) of the semiconductor device. For example, if the semiconductor device is a transistor, the result of the simulation for the operating characteristics of the transistor may be an gate current-gate voltage curve (IG-VG curve), or a drain current-drain voltage curve (ID-VD curve).

In some embodiments, the simulation for the operating characteristics of the semiconductor device may be a Technology Computer Aided Design (TCAD) simulation.

When the layout of the semiconductor integrated circuit whose yield is to be predicted is determined, an emulation for the layout characteristics of the semiconductor integrated circuit may be performed (S114).

The result of the emulation for the layout characteristics of the semiconductor integrated circuit may be, for example, a contact area (dimension) between the semiconductor chips of the semiconductor integrated circuit and/or between the semiconductor chip and the wiring.

In some embodiments, the emulation may include a 3-dimensional (3D) emulation.

In some embodiments, the simulation for the operating characteristics of the semiconductor device and the emulation for the layout characteristics of the semiconductor integrated circuit may be performed simultaneously or separately. For example, the simulation for the operating characteristics of the semiconductor device and the emulation for the layout characteristics of the semiconductor integrated circuit may be performed using one processor. As other example, the simulation for the operating characteristics of the semiconductor device may be performed in a first processor, and the emulation for the layout characteristics of the semiconductor integrated circuit may be performed in a second processor.

Neural network regression analysis may be performed using the results of the simulation for the operating characteristics of the semiconductor device and the emulation for the layout characteristics of the semiconductor integrated circuit (S120).

For example, the processor 110 shown in FIG. 1A may perform neural network regression analysis using the results of the simulation for the operating characteristics of the semiconductor device and the emulation for the layout characteristics of the semiconductor integrated circuit.

According to some embodiments, upon receiving the results of a plurality of simulations of the operating characteristics of a semiconductor device, neural network regression analysis may be performed using the processor 110. Further, for example, after the emulation for the layout characteristics of the semiconductor integrated circuit is performed, upon receiving the results of a plurality of emulations, neural network regression analysis may be performed using the processor 110 (e.g., graphic processing unit (GPU)).

The neural network regression analysis according to some embodiments may be non-linear regression analysis using, for example, a multilayer perceptron. For a detailed explanation, it will be described with reference to FIGS. 3A to 5.

Figure 3A:
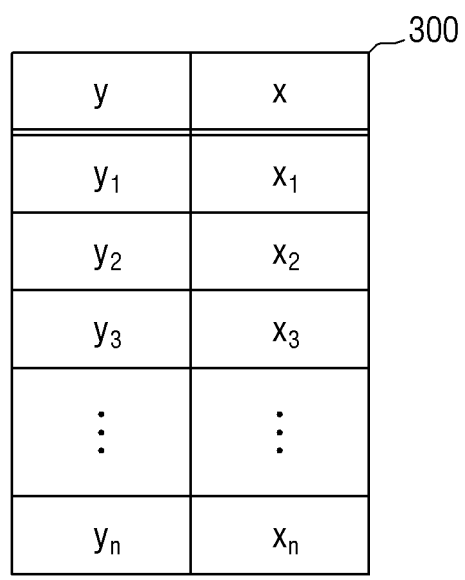
FIGS. 3A and 3B are diagrams explaining a non-linear regression model having one independent variable.
Figure 3B:
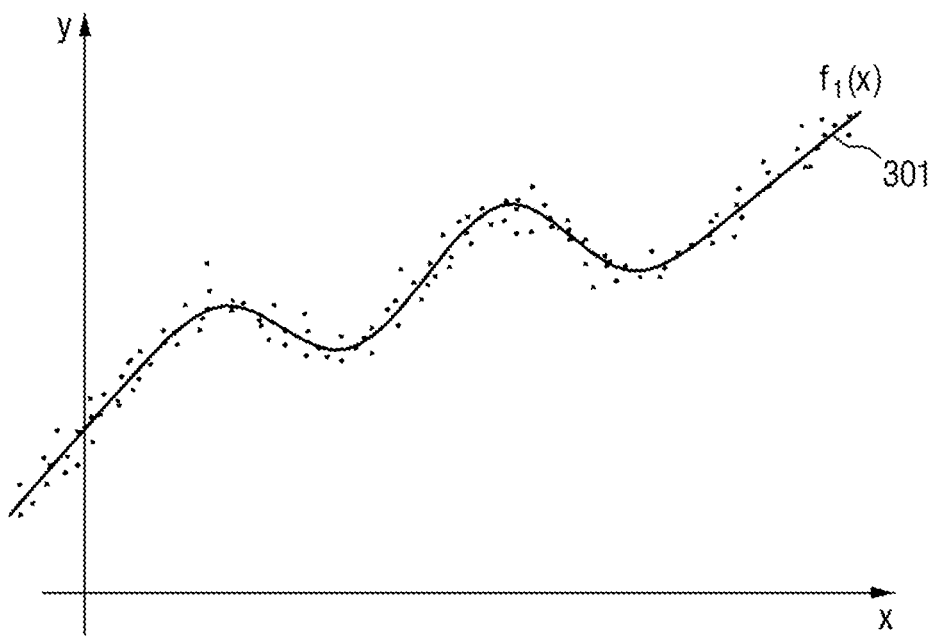

FIGS. 3A and 3B are diagrams explaining a non-linear regression model having one independent variable.

Figure 4A:
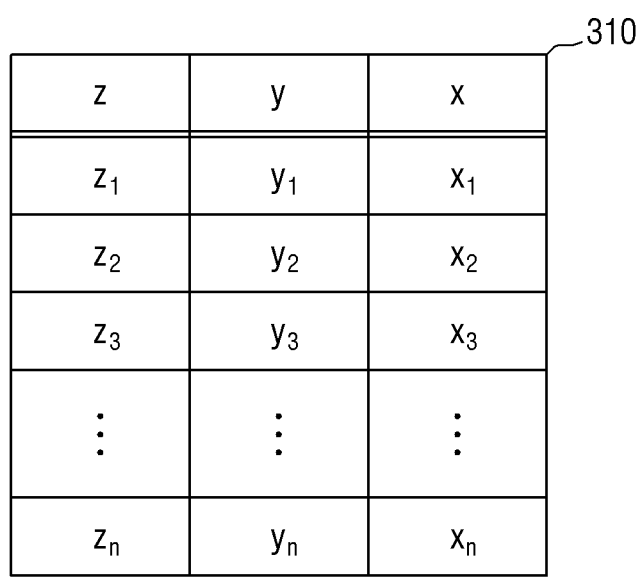
FIGS. 4A and 4B are diagrams explaining a non-linear regression model having two independent variables.
Figure 4B:
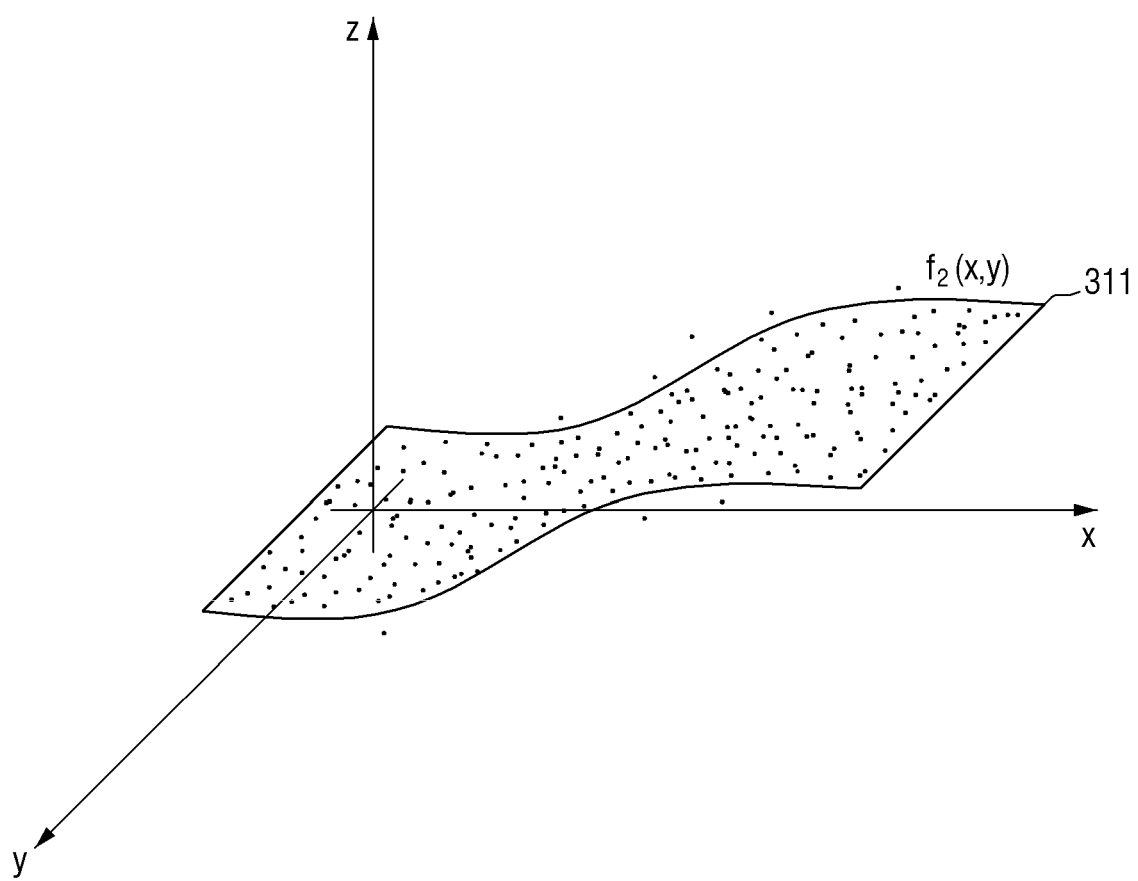

FIGS. 4A and 4B are diagrams explaining a non-linear regression model having two independent variables.

Referring to FIGS. 3A and 3B, the data values of x and y are shown in a table 300. The data appearing in the table 300 may be plotted on a two-dimensional plane based on the x-axis and the y-axis. A line that best represents the plotted dots may be a regression line 301. For example, the regression line 301 can be expressed as a function y=f1(x) that best represents a relationship between a dependent variable y and an independent variable x.

Referring to FIGS. 4A and 4B, the data values of x, y, and z are shown in the table 310. The data represented in the table 310 may be plotted on a three-dimensional plane based on x, y and z axes. A plane that best represents the plotted dots may be a regression plane 311. For example, the regression plane 311 can be expressed as a function z=f2(x, y) that best represents a relationship between a dependent variable z and independent variables x and y. In FIGS. 3A and 3B, the expression of one or two independent variables is for visualizing the regression analysis, and inventive concepts are not limited thereto. By using regression analysis, it is possible to estimate a relationship of a dependent variable to one or more independent variables. In other words, regression analysis may mean a data analysis method capable of estimating a relationship between one or more independent variables and a dependent variable.

Figure 5:
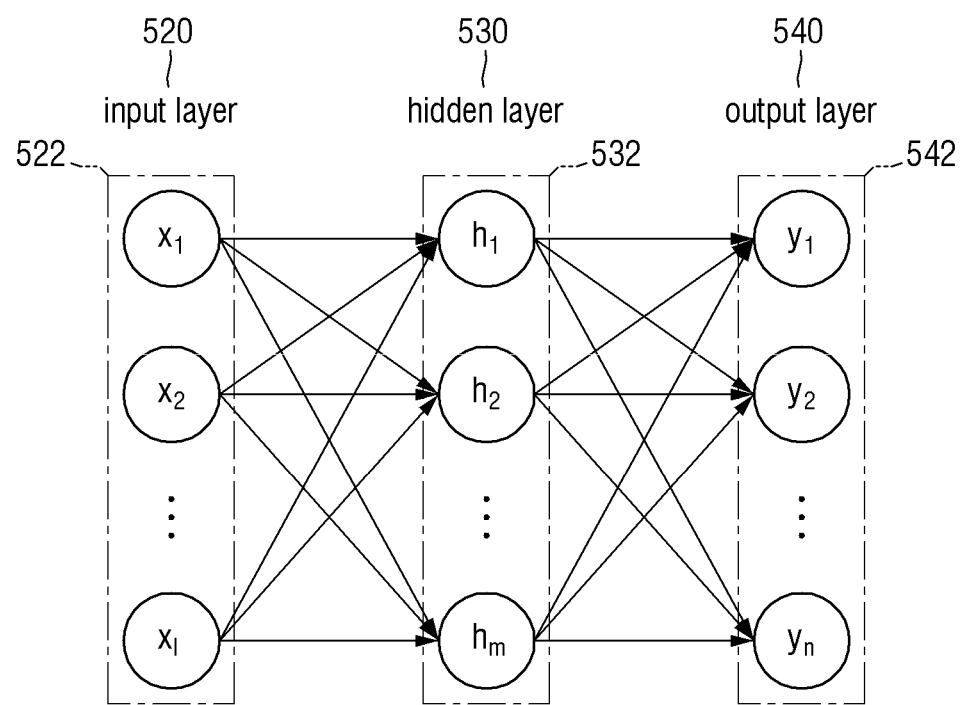
FIG. 5 is an example diagram illustrating a structure of a multilayer perceptron according to some embodiments.

FIG. 5 is an example diagram illustrating a structure of a multilayer perceptron according to some embodiments.

Referring to FIG. 5, the multilayer perceptron may include an input layer 520, a hidden layer 530 and an output layer 540. The hidden layer 530 may be formed of a plurality of layers.

A plurality of independent variables may be inputted to an input node 522 in the input layer 520. The input independent variables may be weighted, when they are transmitted to a hidden node 532 of the hidden layer 530. At the hidden node 532, they may pass through a hidden function. For example, the hidden function may be a sigmoid function. The independent variables that have passed the hidden function may be weighted when they are transmitted to the output layer 540. At an output node 542 of the output layer 540, an output value may be outputted using an activation function. The activation function may be, for example, an identity function. By comparing the output value with an actual value, it is possible to calculate an error and update each weight through backpropagation in a direction in which the calculated error is reduced. For example, when calculating the error, a softmax function may be used. Also, for example, a stochastic gradient descent (SGD) method may be used as a method in which the error is reduced. A series of methods using a multilayer perceptron can be expressed by Equation (1).

$$y = \epsilon_0 + \sum_{j=1}^{H} w_j \left\{ g\left( \epsilon_1 + \sum_{i=1}^{r} w_{ij} x_i \right) \right\} \qquad \text{Equation (1)}$$

where H means the number of hidden nodes 532, p means the number of input nodes 522, g means a hidden function, $w_{ij}$ means a weight when it is transmitted from the input node 522 to the hidden node 532, and $w_j$ means a weight when it is transmitted from the hidden node 532 to the output node 542.

However, in some embodiments, for neural network regression analysis, the use of a multilayer perceptron is merely example, and inventive concepts are not limited thereto. The semiconductor device yield prediction method according to some embodiments has a main purpose of shortening a working time by performing neural network regression analysis.

Referring to FIGS. 2A to 2C and 3A to 5, through the neural network regression analysis according to some embodiments, the operating characteristics of the semiconductor device for the first variable can be expressed as a function. Also, through the neural network regression analysis according to some embodiments, the layout characteristics of the semiconductor integrated circuit for the second variable can be expressed as a function.

In some embodiments, a variation of the threshold voltage of the semiconductor device can be expressed as a function of the first variable (T1, H1).

Specifically, a threshold voltage local variation function for the first variable (T1, H1), e.g., a variation of the threshold voltage of the semiconductor device itself with respect to the height H1 of the fin and the thickness T1 of the gate insulating film of the semiconductor device, can be expressed as a function.

More specifically, as a result of the neural network regression analysis, a geometry fluctuation, a work function fluctuation and a dopant fluctuation for the first variable (T1, H1) can be expressed as functions and the sum of them can be defined as a threshold voltage local variation function.

Further, a variation of the threshold voltage between the semiconductor devices (e.g., TR1 and TR6 of FIG. 2B) can be expressed as a function of the first variable (T1, H1).

Specifically, a threshold voltage global variation function for the first variable (T1, H1), e.g., a variation of the threshold voltage between a plurality of semiconductor devices with respect to the height H1 of the fin and the thickness T1 of the gate insulating film of the semiconductor device, can be expressed as a function.

The threshold voltage local variation function and the threshold voltage global variation function can be expressed by equation (2) and (3).

$$\sigma V_{T_{global}} = f_1(T1, H1) \quad \text{Equation (2)}$$

$$RGF(\text{Random Geometry Fluctuation}) = f_2(T1, H1)$$

$$RWF(\text{Random Workfunction Fluctuation}) = f_3(T1, H1)$$

$$RDF(\text{Random Dopant Fluctuation}) = (T1, H1)$$

$$\sigma V_{T_{local}} = \Sigma RGF, RWF, RDF \quad \text{Equation (3)}$$

However, as mentioned above, a case where the input variable, e.g., the first variable, for the above equation is defined only by two values of the thickness T1 of the gate insulating film and the height H1 of the fin is merely an example, but inventive concepts are not limited thereto. In real implementation, more input variables may be used.

In some embodiments, whether to satisfy the design rule of the semiconductor integrated circuit can be expressed as a function of the second variable (EXPAND, OVERLAY).

Specifically, whether to satisfy the design rule for the second variable (EXPAND, OVERLAY), e.g., the degree of satisfaction of the design rule of the semiconductor integrated circuit with respect to the expansion degree (EXPAND) of the cell and the horizontal position change (OVERLAY) of the cell, can be expressed as a function.

The degree of satisfaction of the design rule for the second variable (EXPAND, OVERLAY) can be expressed by equation (4).

$$DR = f_5(\text{EXPAND}, \text{OVERLAY}) \quad \text{Equation (4)}$$

However, as mentioned above, a case where the second variable is defined only by two values of the expansion degree (EXPAND) of the cell and the horizontal position change (OVERLAY) of the cell is merely an example, but inventive concepts are not limited thereto. In real implementation, more input variables may be used.

Referring again to FIG. 1B, an advanced Monte Carlo simulation may be performed on the functions calculated through neural network regression analysis (S130).

The Monte Carlo simulation refers to an algorithm for calculating the value of a function stochastically using a random value. For a more detailed explanation, it will be described with reference to FIG. 6.

Figure 6:
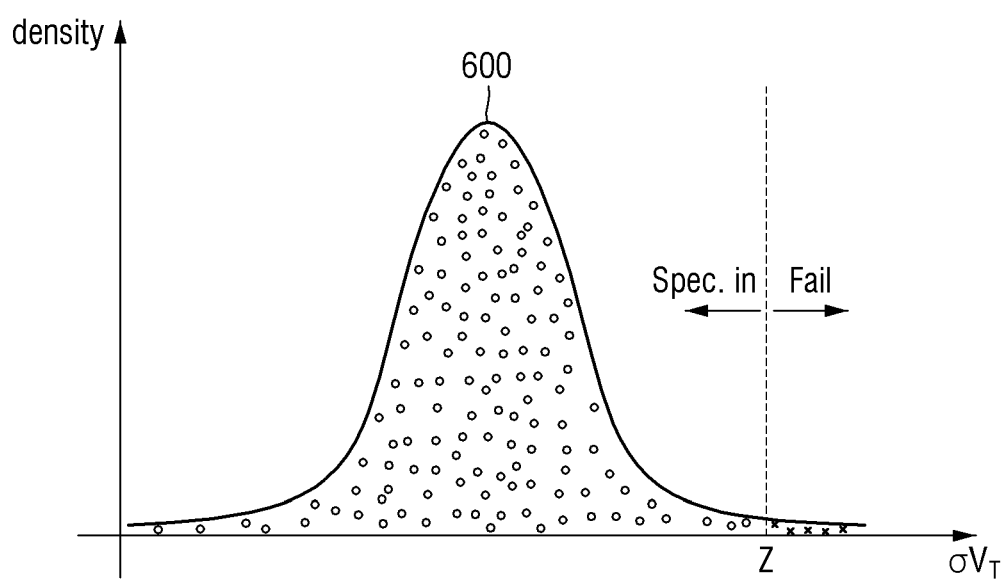
FIG. 6 is an example probability density function for explaining a general Monte Carlo simulation.

FIG. 6 is an example probability density function for explaining a general Monte Carlo simulation.

For convenience of explanation, a method of determining a fail probability of the semiconductor device structure 200_1, the compact model, the netlist 200_2 will be described with reference to FIGS. 2A, 2B, and 6. In some embodiments, the fail probability of the semiconductor device structure 200_1, the compact model and the netlist 200_2 may be a parametric loss yield (PLY).

As described above, $\sigma V_{T_{local}}$ and $\sigma V_{T_{global}}$ can be expressed as a function of the thickness T1 of the gate insulating film and the height H1 of the fin.

In a general Monte Carlo simulation, a random value is generated with respect to the thickness T1 of the gate insulating film and the height H1 of the fin, and the variation of the threshold voltage values that may occur can be expressed as a probability density function 600 by substituting the random value into $\sigma V_{T_{local}}$ and $\sigma V_{T_{global}}$. The circles shown in the probability density function 600 of FIG. 6 are graphical representations of the frequency with respect to the threshold voltage value.

The probability using a general Monte Carlo simulation can be calculated using equation (5) and (6).

$$X_i = I_A = \begin{pmatrix} 1 & \text{if event occurs} \\ 0 & \text{otherwise} \end{pmatrix} \quad \text{Equation (5)}$$

$$P = \frac{1}{n} \sum_{i=1}^{n} X_i \quad \text{Equation (6)}$$

where n means the number of times a random number is generated.

For example, if the generated random number exceeds a desired and/or alternatively predetermined threshold voltage variation reference value Z, the semiconductor device 200_1, the compact model and the netlist 200_2 according to some embodiments may be determined as a fail. In other words, if the total number (n) of times a random number is generated is 1000, and the number of random numbers exceeding the desired and/or alternatively predetermined threshold voltage variation reference value Z is 3, the fail probability is 3/1000.

However, if the desired and/or alternatively predetermined threshold voltage variation reference value Z is a very large value (e.g., 6 sigma or more), the probability of generation of a random number exceeding the reference value Z is very rare (rare event). The number of repetitions of a general Monte Carlo simulation is inevitably increased in order to calculate a meaningful probability. Therefore, a method of reducing the repetition times of the Monte Carlo simulation using an advanced Monte Carlo simulation to be described later will be described with reference to FIGS. 5 to 8B.

Figure 7:
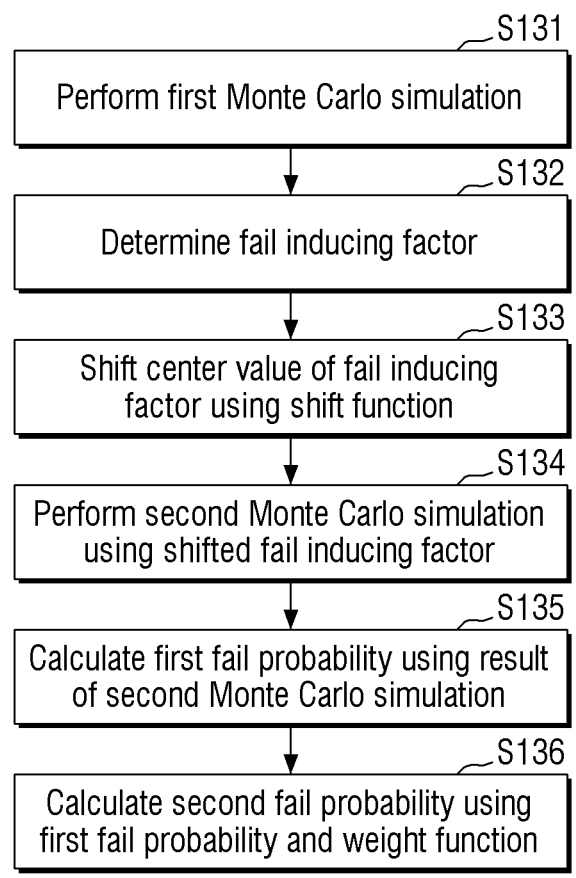
FIG. 7 is an example flowchart illustrating an advanced Monte Carlo simulation according to some embodiments.

FIG. 7 is an example flowchart illustrating an advanced Monte Carlo simulation according to some embodiments.

Referring to FIG. 7, first of all, a first Monte Carlo simulation is performed (S131). The first Monte Carlo simulation may refer to a general Monte Carlo simulation. Proactively, through the first Monte Carlo simulation, it may be roughly confirmed which input variables of a plurality of input variables causes a fail of the semiconductor device and the semiconductor integrated circuit, and it may be determined as a fail inducing factor (S132). For example, in some embodiments, the thickness T1 of the gate insulating film of the semiconductor device and the height H1 of the fin may be the fail inducing factor. However, inventive concepts are not limited thereto.

The center value of the determined fail inducing factor is shifted using a shift function (S133). Shifting the center value of the fail inducing factor may be a process of adjusting the extremely small fail probability such that fails occur more frequently. For a more detailed explanation, it will be described with reference to FIGS. 8A to 9.

Figure 8A:
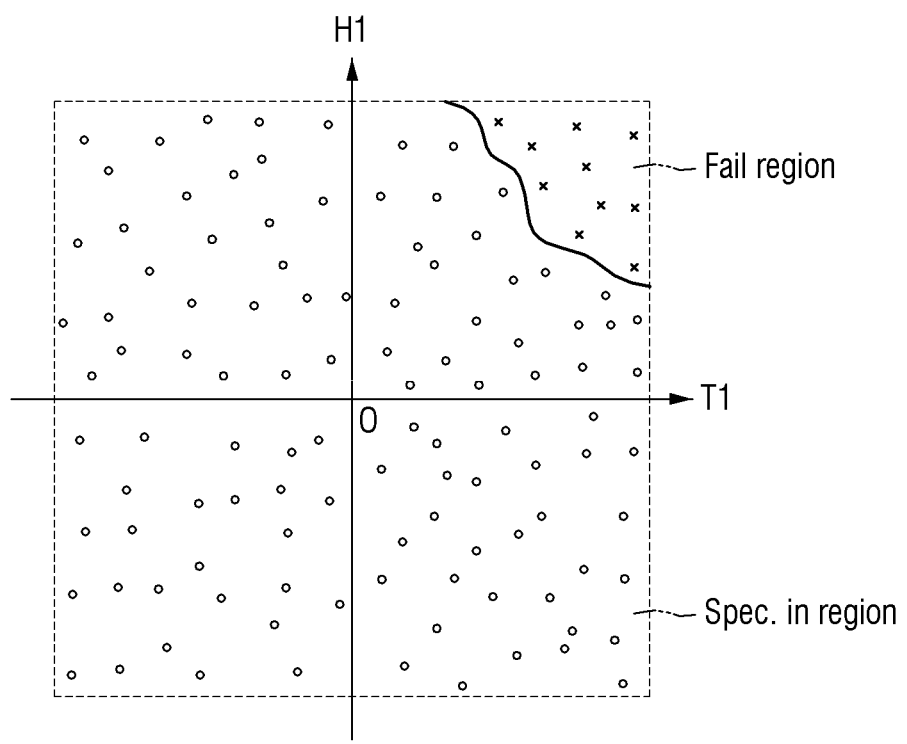
FIG. 8A is an example diagram explaining a range for a fail inducing factor according to some embodiments.

FIG. 8A is an example diagram explaining a range for a fail inducing factor according to some embodiments.

FIG. 8B is an example diagram illustrating shifting the center value of the fail inducing factor according to some embodiments.

Figure 9:
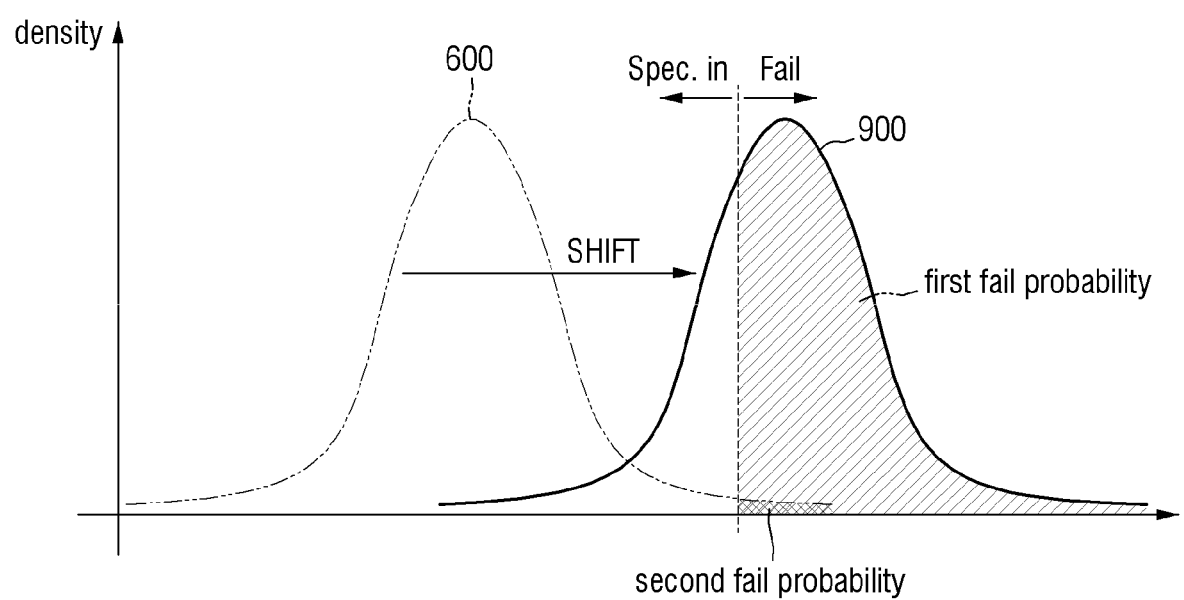
FIG. 9 is an example diagram illustrating a change in the probability density function when shifting the center value of the fail inducing factor according to some embodiments.

FIG. 9 is an example diagram illustrating a change in the probability density function when shifting the center value of the fail inducing factor according to some embodiments.

In FIGS. 8A and 8B, it is assumed that the fail factor according to some embodiments is the first variable (T1, H1).

Referring to FIG. 8A, fail/spec-in regions according to the values of the first variable (T1, H1) are shown. For the sake of convenience of explanation, although the fail region is exaggeratedly shown to be visually distinguishable, the actual fail region may be much smaller than shown.

Referring to FIG. 8B, the origin O of the first variable (T1, H1) may be shifted to the boundary of the fail/spec-in regions. By shifting the origin O of the first variable (T1, H1) to the boundary of the fail/spec-in regions, it is possible to cause relatively more frequent fails in the Monte Carlo simulation.

Referring to FIG. 9, the probability density function may be shifted by shifting the origin O of the first variable (T1, H1) to the boundary of the fail/spec-in regions. In other words, it may mean shifting to a new probability density function 900 from the original probability density function 600.

Referring again to FIG. 7, a second Monte Carlo simulation may be performed using the shifted fail inducing factor (S134). For example, by generating a random number only in the region of the shifted first variable (T1, H1) of FIG. 8B, the second Monte Carlo simulation may more frequently generate the random number determined as a fail.

In other words, performing the second Monte Carlo simulation using the shifted fail inducing factor is equal to obtaining a hatched area, e.g., the first fail probability, in the new probability density function 900 of FIG. 9 (S135).

However, the actual fail probability is a region of the lattice pattern, e.g., a second fail probability, in the original probability density function 600 of FIG. 9. Therefore, in order to calculate the second fail probability from the first fail probability, a weight function is used (S136). A more detailed description will be made with reference to equation (5) and (7).

$$P = \frac{1}{m}\sum_{i=1}^{m} g(X_k)w(X_k) \quad \text{Equation (7)}$$

where m means the total number of random number generations in the second Monte Carlo simulation, g(x) denotes a shift function, and w(x) denotes a weight function.

The proof for equation (7) is replaced by equation (8).

$$P = \int h(x)f_X(x)dx = \int h(x)\frac{f_X(x)}{f_X^*(x)}f_X^*(x)dx \quad \text{Equation (8)}$$

where $f_X^*(x)$ means a shift function, and $$\frac{f_X(x)}{f_X^*(x)}$$

means a weight function.

In FIGS. 6 to 8B, it has been described on the assumption that the fail inducing factor is the first variable (T1, H1), but inventive concepts are not limited thereto. For example, the input variables for the operating characteristics of the semiconductor device as well as the input variables for the layout characteristics of the semiconductor integrated circuit as well as the second variable (EXPAND, OVERLAY) may be fail inducing factors. The fail inducing factors may vary depending on the design of the semiconductor device and the semiconductor integrated circuit.

Referring again to FIG. 1B, a yield of the semiconductor integrated circuit is predicted using the calculated fail probability (S140).

In some embodiments, the fail probability may be a parametric loss yield (PLY) or a defect loss yield (DLY). The parametric loss yield may mean an abnormal operation of the semiconductor device. In addition, the defect loss yield may mean an abnormal contact/non-contact of the semiconductor integrated circuit. For example, a more description will be made with reference to FIGS. 10A and 10B.

Figure 10A:
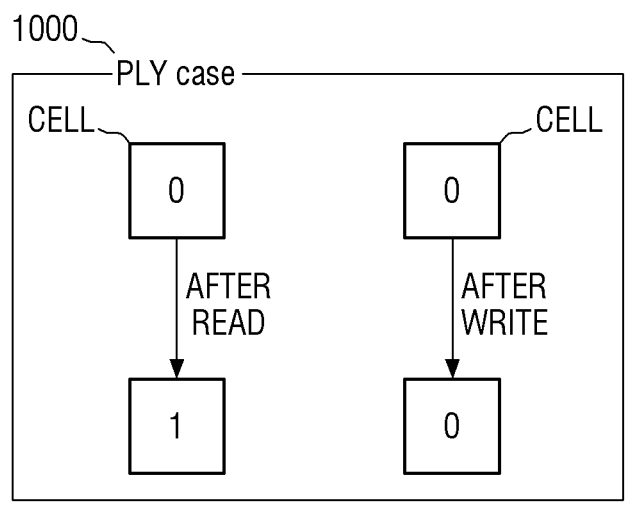
FIGS. 10A and 10B are diagrams illustrating examples of a parametric loss yield and a defect loss yield according to some embodiments.
Figure 10B:
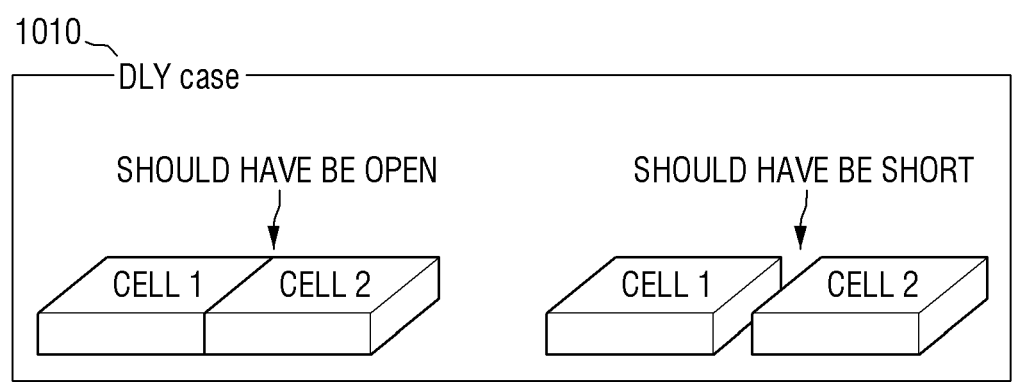

FIGS. 10A and 10B are diagrams illustrating examples of a parametric loss yield and a defect loss yield according to some embodiments.

Referring to FIG. 10A, in the case of a parametric loss yield 1000, for example, when reading data of a cell, if data of the cell is changed after data reading, it may be an abnormal operation of the semiconductor device. Also, for example, when writing data to a cell, if the data of the cell is not changed after data writing, it may be an abnormal operation of the semiconductor device. The parametric loss yield 1000 may mean, for example, a probability that the data is flipped.

Referring to FIG. 10B, in the case of a defect loss yield 1010, for example, although the first cell CELL1 and the second cell CELL must be in non-contact with each other, if they are in contact with each other, it may mean an abnormal contact of the semiconductor integrated circuit. Further, for example, although the first cell CELL1 and the second cell CELL must be in contact with each other, if they are in non-contact with each other, it may mean an abnormal non-contact of the semiconductor integrated circuit. The defect loss yield 1010 may mean, for example, the amount of contact area.

In summary, in the case of the parametric loss yield 1000, the first variable may be determined as an input variable associated with the operating characteristics of the semiconductor device, and a simulation, e.g., a TCAD simulation, of the operating characteristics of the semiconductor device may be performed. The simulation result of the operating characteristics of the semiconductor device can be expressed as a function of the operating characteristics of the semiconductor device and the first variable, for example, a variation function of the threshold voltage for the first variable, by using a neural network regression analysis. The function for the first variable may be used again in the advanced Monte Carlo simulation to calculate the fail probability, i.e. the parametric loss yield 1000, for the semiconductor device.

In the case of the defect loss yield 1010, the second variable may be determined as an input variable associated with the layout characteristics of the semiconductor integrated circuit, and an emulation, e.g., a 3D emulation, of the layout of the semiconductor integrated circuit may be performed. The emulation result of the layout characteristics of the semiconductor integrated circuit can be expressed as a function of the layout characteristics of the semiconductor integrated circuit and the second variable, for example, a function for the satisfaction of the design rule with respect to the second variable, by using a neural network regression analysis. The function for the second variable may be used again in the advanced Monte Carlo simulation to calculate the fail probability, e.g., the defect loss yield 1010, for the semiconductor integrated circuit.

According to some embodiments, through the neural network regression analysis, the working time can be shortened primarily and the working time can be shortened secondarily using the advanced Monte Carlo simulation.

Accordingly, it is possible to dramatically shorten the working time in the field of the semiconductor yield simulation.

FIG. 11 is an example flowchart illustrating a method of manufacturing a semiconductor device using a semiconductor yield prediction method, according to some embodiments.

For the sake of convenience of description, repeated descriptions will be omitted, and differences will be mainly described.

Referring to FIG. 11, first, a structure of a semiconductor device and a layout of a semiconductor integrated circuit whose yield is to be predicted are determined (S1100).

Then, a simulation for predicting a yield of the semiconductor device and the semiconductor integrated circuit described with reference to FIGS. 1A to 10 is performed using a yield prediction apparatus 100 (S1110).

Then, the predicted yield is compared with a desired and/or alternatively predetermined reference value (S1120). If the predicted yield is equal to or less than the desired and/or alternatively predetermined reference value, the structure of the semiconductor device and/or the layout of the semiconductor integrated circuit are newly determined (S1100), and a process of performing the simulation (S1110) is repeated.

If the predicted yield exceeds a desired and/or alternatively predetermined reference value, a semiconductor integrated circuit is manufactured using the determined structure of the semiconductor device and the determined layout of the semiconductor integrated circuit (S1130).

What is claimed is:

1. A yield prediction apparatus comprising:
    at least one processor coupled to at least one non-transitory computer-readable medium,
    the at least one processor being configured to receive a first variable associated with operating characteristics of a semiconductor device and perform a simulation for the operating characteristics of the semiconductor device,
    the at least one processor being configured to perform neural network regression analysis using a result of the simulation to determine a determined first function for the first variable, and
    the at least one processor being configured to predict a yield of a semiconductor integrated circuit based on a Monte Carlo simulation, an input of the Monte Carlo simulation including the determined first function.

2. The yield prediction apparatus of claim 1, wherein the determined first function includes a local variation function on the first variable of the semiconductor device and a global variation function on the first variable of the semiconductor device.

3. The yield prediction apparatus of claim 2, wherein
    the at least one processor is configured to predict the yield of the semiconductor integrated circuit by,
    generating a compact model and a netlist of the semiconductor integrated circuit including the semiconductor device having the local variation function and the global variation function, and
    predicting the yield of the semiconductor integrated circuit by predicting a yield for the compact model and the netlist.

4. The yield prediction apparatus of claim 1, wherein the at least one processor is configured to predict the yield of the semiconductor integrated circuit by determining a parametric loss yield (PLY) of the semiconductor integrated circuit.

5. The yield prediction apparatus of claim 4, wherein the parametric loss yield (PLY) is a probability of flipping data of the semiconductor integrated circuit.

6. The yield prediction apparatus of claim 1, wherein the at least one processor is configured to perform the advanced Monte Carlo simulation to obtain a fail probability using a shift function and a weight function such that the Monte Carlo simulation reduces a first number of simulation repetitions to obtain the fail probability compared to general Monte Carlo simulation.

7. The yield prediction apparatus of claim 6, wherein the at least one processor is configured to perform the advanced Monte Carlo simulation by,
    performing a first Monte Carlo simulation to determine, in the first variable, a fail inducing factor that causes a fail of the semiconductor device, and
    shifting a center value of the fail inducing factor using the shift function.

8. The yield prediction apparatus of claim 7, wherein the at least one processor is configured to perform the Monte Carlo simulation by,
    performing a second Monte Carlo simulation using the fail inducing factor in which the center value is shifted,
    determining a first fail probability of the semiconductor device from a result of the second Monte Carlo simulation, and
    obtaining a second fail probability of the semiconductor device using the first fail probability and the weight function associated with the shift function.

9. The yield prediction apparatus of claim 1, wherein the at least one processor is configured to perform the simulation for the operating characteristics of the semiconductor device simulation using a Technology Computer Aided Design (TCAD) simulation.

10. The yield prediction apparatus of claim 1, wherein the neural network regression analysis includes non-linear regression analysis using a Multi-Layer Perceptron (MLP).

11. The yield prediction apparatus of claim 1, wherein
    the at least one processor is configured to receive a second variable associated with layout characteristics of the semiconductor integrated circuit and perform an emulation for the layout characteristics of the semiconductor integrated circuit,
    the at least one processor is configured to perform the neural network regression analysis using a result of the emulation to determine a determined second function for the second variable, and
    the at least one processor being configured to perform the Monte Carlo simulation to predict the yield of the semiconductor integrated circuit, the input of the Monte Carlo simulation including the determined second function.

12. A yield prediction apparatus comprising:
    at least one processor coupled to at least one non-transitory computer-readable medium,
    the at least one processor being configured to receive a first variable associated with layout characteristics of a semiconductor integrated circuit and to perform an emulation for the layout characteristics of the semiconductor integrated circuit,
    the at least one processor being configured to perform a neural network regression analysis using a result of the emulation to determine a determined first function for the first variable, and
    the at least one processor being configured to predict a yield of the semiconductor integrated circuit based on a Monte Carlo simulation, an input of the Monte Carlo simulation including the determined first function.

13. The yield prediction apparatus of claim 12, wherein at least one processor is configured to predict the yield of the semiconductor integrated circuit by determining a defect loss yield (DLY) of the semiconductor integrated circuit.

14. The yield prediction apparatus of claim 13, wherein the result of the emulation includes a contact area (dimension) change amount of the semiconductor integrated circuit.

15. The yield prediction apparatus of claim 12, wherein the at least one processor is configured to perform the Monte Carlo simulation to obtain a minimum probability using a shift function and a weight function such that the Monte Carlo simulation reduces a first number of simulation repetitions to obtain the minimum probability compared to a general Monte Carlo simulation.

16. The yield prediction apparatus of claim 15, wherein the at least one processor is configured to perform the Monte Carlo simulation by
performing a first Monte Carlo simulation to determine, in the first variable, a fail inducing factor that causes a fail of a semiconductor device, and
shifting a center value of the fail inducing factor using the shift function.

17. The yield prediction apparatus of claim 16, wherein the at least one processor is configured to perform the Monte Carlo simulation by
performing a second Monte Carlo simulation using the fail inducing factor in which the center value is shifted,
determining a first fail probability of the semiconductor device from a result of the second Monte Carlo simulation, and
obtaining a second fail probability of the semiconductor device using the first fail probability and the weight function associated with the shift function.

18. The yield prediction apparatus of claim 12, wherein the neural network regression analysis includes non-linear regression analysis using a Multi-Layer Perceptron (MLP).

19. The yield prediction apparatus of claim 12, wherein
the at least one processor is configured to receive a second variable associated with operating characteristics of a semiconductor device and to perform a simulation for the operating characteristics of the semiconductor device,
the at least one processor is configured to perform the neural network regression analysis using a result of the simulation to determine a determined second function for the second variable, and
the at least one processor is configured to predict the yield of the semiconductor integrated circuit based on the Monte Carlo simulation, the input of the Monte Carlo simulation further including the determined second function.

20. A method for manufacturing a semiconductor device, comprising:
determining a determined structure of a semiconductor device and a determined layout of a semiconductor integrated circuit;
performing a simulation using a yield prediction apparatus to predict a yield of the semiconductor integrated circuit including the determined structure of the semiconductor device and the determined layout of the semiconductor device,
the yield prediction apparatus including at least one processor coupled to at least one non-transitory computer-readable medium,
the at least one processor being configured to receive a first variable associated with operating characteristics of the semiconductor device and perform a simulation for the operating characteristics of the semiconductor device,
the at least one processor being configured to receive a second variable associated with layout characteristics of the semiconductor integrated circuit and perform an emulation for the layout characteristics of the semiconductor integrated circuit,
the at least one processor being configured to perform a neural network regression analysis using a result of the simulation and a result of the emulation to determine a determined first function for the first variable and a determined second function for the second variable, and
the least one processor being configured to predict a predicted yield of the semiconductor integrated circuit based on a Monte Carlo simulation, an input of the Monte Carlo simulation including the determined first function and the determined second function;
manufacturing the semiconductor integrated circuit using the determined structure of the semiconductor device and the determined layout of the semiconductor integrated circuit in response to the predicted yield being equal to or greater than a desired reference value.

* * * * *